United States Patent [19]

Netting et al.

[11] 3,960,583

[45] June 1, 1976

[54] METHOD OF PREPARING MODIFIED HOLLOW, LARGELY SPHERICAL PARTICLES BY SPRAY DRYING

[75] Inventors: David I. Netting, Springfield, Pa.; Elliot P. Hertzenberg, Wilmington, Del.

[73] Assignee: Philadelphia Quartz Company, Valley Forge, Pa.

[22] Filed: May 2, 1974

[21] Appl. No.: 466,326

[52] U.S. Cl. .......................... 106/122; 106/154 R; 106/154 Z; 106/168; 106/205; 106/288 B; 260/2.5 B
[51] Int. Cl.² ............................................. C08J 9/16
[58] Field of Search ............... 252/317; 264/13, 14; 106/122, 288 B; 260/2.5 B

[56] References Cited
UNITED STATES PATENTS

| | | | |
|---|---|---|---|
| 2,555,282 | 5/1951 | Ashley | 252/317 |
| 2,797,201 | 6/1957 | Veatch et al. | 260/2.5 B |
| 3,561,003 | 2/1971 | Lanham | 106/22 |
| 3,607,777 | 9/1971 | Winyall | 252/317 |
| 3,779,957 | 12/1973 | Vassiliades et al. | 260/2.5 B |
| 3,794,503 | 2/1974 | Netting | 106/288 B |
| 3,796,777 | 3/1974 | Netting | 264/13 |

*Primary Examiner*—Theodore Morris
*Attorney, Agent, or Firm*—Fred Philpitt; Ernest Posner

[57] ABSTRACT

Products of a generally spherical nature with particulate matter embedded in the walls are prepared by forming a suspension of said particulate matter in a solution of a film-forming substance in a volatile solvent, spray drying said suspension-solution thereby forming the product which may be further dried if necessary to remove solvent and to "set" the walls. Such products can be used to provide pigmenting, reactive and/or fire retardant properties to organic systems to which they are added as fillers. The density of the product can also be controlled by this method for use as fillers in applications in which segregation of such fillers from the plastic matrix is normally a problem.

23 Claims, No Drawings

METHOD OF PREPARING MODIFIED HOLLOW, LARGELY SPHERICAL PARTICLES BY SPRAY DRYING

BACKGROUND

Low density fillers consisting of synthetic hollow spheres have recently been marketed for use in filling or extending various polymer systems including thermoset plastics such as unsaturated polyesters and epoxies. Such spheres are especially useful for incorporation into unsaturated polyester resin systems which are used to prepare simulated wood. They are also useful as fillers for polyesters in spray-up applications to prepare white ware such as bath tubs and sinks.

The hollow spheres utilized for this purpose are generally prepared by spray drying a solution of a film-forming material in a volatile solvent at elevated temperatures, thereby forming hollow spheres which are recovered from the spray dryer. These spheres may be further dried by heating, vacuum treatment or exposure to dry air to remove solvent and set the walls. A wide variety of film forming materials such as those discussed in U.S. Pat. No. 2,797,201 can be used to produce such spheres. A system of particular value in our invention is disclosed in U.S. Pat. No. 3,796,777. This patent discloses the spray drying of a solution containing sodium silicate and a polysalt to form small hollow spheres useful as fillers in plastics.

The polymer systems in which these hollow spheres are used may often require other additives such as pigments or fire retardants. Processing of such systems may also require that the density of the hollow sphere filler approximate the density of the polymer system. We have now discovered a method to modify such fillers to provide properties which meet these requirements.

SUMMARY OF THE INVENTION

Synthetic hollow products of a generally spherical nature with particular matter embedded in the walls can be prepared by forming a suspension of said particulate matter in a solution of a film-forming substance in a volatile solvent, and spray drying said suspension-solution. Further drying may be carried out to remove solvent and to set the walls. By selecting the particles that are incorporated into the walls, products with pigmenting properties, reactive surfaces, controlled density and fire retardant properties can be prepared.

THE INVENTION

Almost any film-forming substance which can be dissolved in a volatile solvent can be used to form largely hollow particles by spray drying. Examples of synthetic film-forming systems useful in this process are polyvinyl alcohol, phenol-formaldehyde resin, urea-formaldehyde resin, melamine-formaldehyde resin, alkyd resin, polysiloxane, cellulose esters, polyvinyl chloride, polyvinyl chloride-polyvinyl alcohol copolymers, polyvinyl butyral, polystyrene, polyvinylidene chloride, polymethyl methacrylate, polyallyl, polyethylene, and polyamide resins. Natural film-forming systems are also useful such as soybean protein, zein protein, alginates, cellulose xanthate, and cuprammonium cellulose. Inorganic film-formers are also useful such as sodium silicate, polyborates and polyphosphates.

In general, largely spherical particles are produced from such substances by forming a solution of the film-forming substance in a volatile solvent and spray drying that solution under conditions that lead to the production of hollow particles of the size required. A substance that breaks down to provide a gas in the interior of the particle may be required with certain systems to maintain the expansion of the product while it is still plastic and to prevent breakage under atmospheric pressure when the walls have set. Examples of useful blowing agents include inorganic and organic salts of carbonates, nitrites, carbamates, oxalates, formates, benzoates, sulfites and bicarbonates such as sodium bicarbonate, ammonium carbonate, magnesium oxalate, etc. Other organic substances are also useful such as p-hydroxy phenylazide, di-N-nitropiperazines, polymethylene nitrosamines and many others. Selection of a particular blowing agent would be based upon compatibility with the film forming system and the intended use of the product.

Film forming systems that are of particular value in carrying out the process of this invention and which do not require the addition of a gas forming substance as a blowing agent are disclosed in U.S. Pat. No. 3,796,777, hereby incorporated by reference. Hollow spheres are produced by forming an homogeneous aqueous solution comprising a sodium silicate and a polysalt selected from a group consisting of ammonium pentaborate, sodium pentaborate and sodium hexametaphosphate and then spray drying the solution under conditions necessary to produce hollow spheres of the size required. The spheres are further dried to reduce the water content and to set the walls. Such spheres have a bulk density of about 0.6 to 20 lbs/ft$^3$, a true particle density of about 2 to 40 lbs/ft$^3$ and a particle size of about 1 to 500 microns.

The particulate matter incorporated into the walls of the hollow, largely spherical particles, is varied according to the properties desired in the product. In general any particulate matter that does not react with or dissolve in the components forming the solution to be spray dried are useful. In addition the particulate matter selected must also be thermally stable at the temperatures necessary for spray drying and any subsequent drying that is desired. The size of this particulate matter has some dependence upon the property desired in the product. The particles should not be larger than about 10 microns and preferably they should not be larger than about 5 or 6 microns. Particles larger than about 10 microns tend to interfere with the process of producing hollow spherical particles. Usually the particles may be as small as practical, about 0.05 microns but with some exceptions as discussed subsequently. The particles should also be reasonably dispersible so that large agglomerates do not persist in the suspension-solution to be spray dried and in the walls of the product.

It has been found that particles used to contribute pigmentary properties to the product should be smaller than about 5 to 6 microns and should exhibit strong pigmentary properties. Both colored and white effects are important to this embodiment of the invention. Many compounds are useful for this embodiment of our invention. Exemplary are metal oxides such as iron oxides, chromium III oxide, titanium dioxide, zinc oxide, antimony trioxide, zirconium dioxide, complex oxides of titanium, chromium and antimony; silicates such as praseodynium zirconium silicate, vanadium zirconium silicate and talc. Other suitable particles are simple and complex compounds such as copper phthalocyanine, carbon black, nickel antimony titanate, cadmium sulfide, lead chromate, cobalt aluminate, silicon carbide and numerous other pigments that are generally used in the ceramic industry.

In some applications it is necessary that resins and fillers are combined for an extended time before the system is gelled or set. In such cases, a filler that has an appreciable difference in density from the resin, will segregate causing defective finished products. Therefore, a process that is capable of producing hollow spherical particles of densities to match the densities of such resin systems is of great value. The densities of unmodified hollow particles can be varied somewhat by altering the processing conditions, however, such changes are usually accompanied by changes in other desirable properties. We have found that by incorporating particles in the walls of such hollow spherical particles, products of various densities can be prepared without altering the desirable particle properties. The size of the particles can be about 0.05 microns to about 10 microns as long as the particles do not interfere with the formation of the product. Many compounds are useful for this invention including oxides; such as magnesium oxide, alumina, zinc oxide and silica gel; alkaline earth salts such as calcium carbonate, calcium silicate (wollastonite), magnesium silicate (talc), barium sulfate and calcium sulfate as well as carbon black, finely ground glass and many other simple and complex materials. The particles used to provide controlled density product can also be pigmented.

Particles with chemical activity can be embedded in the walls of said hollow spherical particles to provide them with reactive surfaces. We have found that particles between 0.5 and 5 microns were the most efficient in introducing reactive surfaces to the product. Particles smaller than 0.5 microns can become completely embedded in the walls so that few reactive surfaces are exposed. Particles larger than about 5 microns are not efficient because of their low surface to mass relationship. Examples of active compounds or those that can be activated among others are useful for this process and include activated charcoal, zinc oxide, silica gel, magnesium oxide, zeolites, ferrites, molecular sieves and ion exchange resins of the correct particle size.

Fire retardant compounds are important additives to many of the polymer systems in which these hollow particles are useful as fillers. Therefore, products with fire retardant compounds embedded in the walls are advantageous in preparing such systems. We have found that such fire retardant raw material particles should be between about 0.5 and 3 microns. The particles should not be embedded completely within the walls and particles smaller than 0.5 micron would have increased chances of being so embedded. Particles larger than about 3 microns appear to be less efficient than particles within this range. Any particulate fire retardant that is sufficiently stable to heat can be used. Examples of such materials include antimony trioxides, antimony tetraoxide, combinations of antimony trioxide and talc, zinc borate, aluminum hydroxide, barium metaborate, and combinations of these materials.

The solutions of the film-forming materials to be spray dried can be formed in any volatile solvent in which the film-forming substance dissolves. Examples of useful solvents include water, ethyl acetate, methyl cellosolve, acetone, trichlorethylene, monochlorobenzene, carbon tetrachloride, xylene, methanol, and ethanol. Those skilled in the art of applying such film-forming materials will recognize that many other solvents and combinations of solvents can be used.

The particulate matter to be embedded in the walls of the product can be blended into the completed solution of film-forming material or it can be blended with a portion of the solvent used in preparing the solution with subsequent blending of the film-former with the solvent suspension. Depending upon the ease with which the particulate matter is dispersed, blending may simply consist of stirring the material into the solution or it may require more shear as might be supplied by ball milling or colloid milling. The suspension-solution so prepared is then spray dried to form the modified hollow, largely spherical product.

We have found that the solution used to form the suspension-solution should have a concentration of 5 to 50% by weight of the film-forming substance. Solutions that contain less film-forming material may be satisfactory for forming unmodified hollow spheres but are not particularly suitable for embodiments of this invention. The amount of particulate matter required to achieve the desired modification varies from about 0.5 to 75% of the total weight of the product so that the particulate solids represent 0.5 to 75% of the solids in the suspension-solution. Therefore, the suspension-solution can have the following composition: total solids (film-forming + particulate) of 5.25 to 80%, dissolved film-forming solids of 5 to 49.8% and suspended particulate solids of 0.25 to 60%. The ratio of particulate solids to film-forming solids can be 0.01:1 to 3:1. When a blowing agent is used it generally comprises more than 0.2 but less than 2.0% of the solids in said suspension-solution.

In the film-forming system that we have found of particular advantage in carrying out our invention comprising a homogeneous solution of sodium silicate and a polysalt, the ratio of a polysalt solids to silicate solids should be between 0.02/1.0 and 3.0/1.0. If a solution of ammonium pentaborate and sodium silicate is used the solids would be 5 to 35% with 3 to 15% ammonium pentaborate (APB) with a ratio of APB solids to sodium silicate solids between 0.03:1 and 0.5:1 and preferably 0.06:1 and 0.5:1. Therefore the suspension-solution using such a film-forming system would have the following composition. The total solids (film-forming + particulate) are 5.25 to 68%, the dissolved film-forming solids (APB + silicate) are 5.0 to 34.5% with 2.4 to 12% dissolved APB solids, and the suspended particulate solids are 0.25 to 51.2%. A system including sodium pentaborate (SPB) would have a ratio of SPB solids to sodium silicate between 0.02:1 and 0.3:1 and the suspension-solution would have the following composition. The total solids (film-forming + particulate) are 18.2 to 68%, the dissolved film-forming solids (SPB + silicate) are 17.4 to 34.5% with 6 to 7% SPB and the suspended particulate solids is 0.9 to 51.2%. A system with sodium hexametaphosphate (SHP) would have a ratio of SHP solids to sodium silicate solids between 1:1 and 3:1 and the suspension-solution would have the following composition. The total solids (film-forming + particulate) are 31 to 80%, the dissolved film-forming solids (SHP + silicate) are 29.6 to 48% and the suspended particulate solids are 1.5 to 60%.

We have found that specific product characteristics in the product require some different proportions of particulate material embedded in the walls. If the product is to act as a low density filler and contribute pigmenting properties to the filled resin system it requires between about 1 and 15% by weight of pigment particles embedded in the walls. Products with reactive surfaces require between about 10 and 50% by weight reactive particles in the walls. Less than 10% reactive particles does not provide sufficient reactivity while more than 50% reactive particles does not promote efficient use of the particles. Products that provide fire retardant properties as well as extending the resin system require 25 to 75% by weight of the fire retardant compound in the walls. This comparatively high loading is necessary to obtain sufficient fire retardant chemical since fillers are generally added to resin systems at 10% by weight loadings or less. In order to control the density of the product 15 to 75% by weight of embedded particles are required. In general the density of the product is proportional to the amount of particulate material embedded in the walls. However small changes in the density at any particular loading of particles can be affected by changing the specific gravity of the particles. We have used particles with specific gravities of 2.5 to 5.7. In order to provide products with these various particle loadings the composition of the suspension-solution must be altered. Table I summarizes the compositions to produce each of these modifications for the general film-forming systems while Table II summarizes the compositions required for these modifications when the film-forming system of APB and sodium silicate is used.

Table I

Composition of Suspension-Solution

| Modification | Particles in Product (%) | Film Forming Solids (%) | Particulate Solids (%) |
|---|---|---|---|
| Pigmenting | 1–15 | 5–49.8 | 0.05–8.9 |
| Reactive | 10–50 | 5–48 | 0.5–33 |
| Fire Retardant | 25–75 | 5–43 | 1.2–60 |
| Controlled Density | 15–75 | 5–46 | 0.8–60 |

The remainder of the suspension-solution is solvent.

Table II

Composition of Suspension-Solution with APB & Silicate

| Modification | Particles in Product (%) | Film-forming Solids, APB + Silicate (%) | Particulate Solids (%) |
|---|---|---|---|
| Pigmenting | 1–15 | 5–34.8 | 0.05–5.6 |
| Reactive | 10–50 | 5–33.8 | 0.5–26 |
| Fire Retardant | 25–75 | 5–31.5 | 1.2–51.2 |
| Controlled Density | 15–75 | 5–33 | 2.8–51.2 |

The remainder of the suspension-solution is water.

Any conventional spray drying equipment can be used to implement the process of this invention. The suspension-solution can be atomized into the spray tower by either an atomized wheel or a spray nozzle. Since a wide range of film-forming materials and solvents can be used in this process a wide range of spray drying temperatures can be used. We have found that inlet temperatures of 50° to 500°C can be used with outlet temperatures of about 40° to 300°C. In particular we have found that satisfactory product with particles embedded in the walls can be prepared from the preferred film-forming system of sodium silicate and polysalt by spray drying the material at an inlet temperature of 200° to 500°C and an outlet temperature of 100° to 300°C.

The product recovered from the spray dryer may be ready for packaging and/or use, or it may require an additional drying step. The systems that use water as the solvent and especially the system utilizing sodium silicate and a polysalt require this additional drying step. The spray dried product from such water solvated systems usually contain more than 10% water. This water content is reduced to about 7% or less by slowly heating the particles to temperatures between 70° and 400°C.

The products of these process steps are hollow particles that are for the most part spherical with some agglomerated spheres. Some of the products are multicellular or multispherical. Multispherical particles are composed of spheres within spheres. Surprisingly the inclusion of small or large amount of particulate matter in the product does not produce a significant increase in the number of broken or fragmented particles or in the number of non-spherical particles when compared to products made excluding the particulate material. The modified spherical products have particle sizes from about 1 to 500 microns, of course the true particle densities will be dependent on the modification of the product but in general the true particle densities range between 0.6 and 200 lbs/ft$^3$ (specific gravity 0.1 to 3.3).

The hollow spherical products that incorporate pigmenting particles exhibit uniformly high tinctorial strength and true particle densities of about 0.9 to 40 lbs/ft$^3$. Both colored and white pigmented products are produced and are of value. The colored product can be used to impart colors to various systems while the white products are useful in many diverse applications as void hiding materials. The controlled density products are used as fillers, in particular systems which have long setting times after the preparation of the system and have true particle densities of 31.2 lbs/ft$^3$ to 200 lbs/ft$^3$. The spheres with reactive surfaces have true particle densities between 20 and 40 lbs/ft$^3$. The fire retardant product can be used to extend and impart fire retardancy to numerous polymer systems and have true particle densities between 25 and 81 lbs/ft$^3$.

The product particles are largely spherical and non-porous as demonstrated by the fact that more than 95% of the product will float on a liquid that has a higher density than that of the particles. A more important criterion of largely spherical and non-porous character is demonstrated by checking the density of a filled organic polymer system; we have used a filled unsaturated polyester resin. If a substantial number of particles are broken, have pores or are open in some manner, the resin will penetrate the sphere and the overall density of the filled resin will increase on standing as compared with the density of the filled resin as first prepared. If the products are substantially unbroken or non-porous, this increase in density after 48 hours will be no more than about 10% and may be no more than about 2 to 5%. Typically, resins filled with products of our invention show increases in density, that average about 3.5 to 7% and in many cases a smaller increase is noted.

A noted hereinbefore, the products of our process are useful as fillers for polymer systems. All of the products are useful in thermoset polymers such as styrene cross linked polyester, phenolformaldehyde copolymers, epoxies and polyurethanes. Certain of the products of our process are useful in thermoplastic polymers such as polyethylene, polystyrene, copolymers of styrene, polyacrylonitrile, poly(ethyleneterphthalate) and nylon. The product modified to control the density and to promote fire retardant properties are also useful in extending such thermoplastic materials.

EXAMPLES

A further understanding of our invention can be obtained from the following examples which illustrate certain embodiments of our invention and should not be considered restrictive. The preparation of our modified hollow spheres was carried out using a Nichols-Niro portable spray dryer with a centrifugal atomizer. In the examples that describe the use of sodium silicate as the film-forming material "D" commercial grade sodium silicate ($SiO_2/Na_2O$ of 2.0/1.0 and 4.4% $SiO_2$) which is made by the Philadelphia Quartz Company, of Valley Forge, Pa. was used. All proportions or percentages are by weight unless otherwise indicated.

EXAMPLE 1

As an example of the prior art method, hollow spheres were prepared using an aqueous solution of polyvinyl alcohol. The solids content of the solution was 5% and 0.5% ammonium carbonate was included as a blowing agent. The solution was spray dried at an inlet temperature of 310° to 320°C and an outlet temperature between 130° to 135°C. The product appeared to be mostly spherical upon microscopic examination and had a bulk density of 4.2 lbs/ft$^3$. A sample of the product was suspended in a bath of petroleum naphtha and it was found that 98% of the sample was floating after 24 hours.

EXAMPLE 2

An aqueous dispersion containing 10% by weight of iron oxide (Brown 418, Cities Service Company) pigment was ball milled to disperse agglomerates. Sufficient of this dispersion was substituted for water in the solution of Example 1 to provide 0.5% iron oxide. Therefore, the iron oxide constituted 9% of the solids of the product after spray drying under the conditions of Example 1. The uniformly brown colored product appeared mostly spherical under microscopic examination and had a bulk density of 5.0 lbs/ft$^3$, and true particle density of 15.3 lbs/ft$^3$. It was found that 97.7% of the spheres floated in a bath of petroleum naphtha.

EXAMPLE 3

As an example of the prior art method of preparing hollow spheres using the film-forming system consisting of sodium silicate and a polysalt, hollow spheres were prepared as follows. Sodium silicate, 500 parts by weight (pbw) of D brand silicate ($SiO_2/Na_2O$ of 2.0 and 44% solids) were mixed thoroughly with 500 pbw of a 10% solution of ammonium pentaborate. The water used to dissolve the ammonium pentaborate was first heated to above about 60°C. The mixed solutions were agitated until all lumps were dispersed and dissolved. The resulting homogeneous solution was fed to the spray dryer with an inlet temperature between 390° and 420°C and an outlet temperature between 140° and 160°C. The atomization pressure was 6 kg/cm$^2$. The product recovered from the spray dryer was subject to an additional drying step in an oven. The initital temperature was below about 100°C and gradually the temperature was raised to about 300°C during the period of about one hour. This product had a water content of 3.3%, a bulk density of 12 lbs/ft$^3$ and the particle size range was 50 to 200 mesh. Ten pbw of this product were mixed with 100 pbw of a typical polyester resin (Polylite 32–353 from Reichhold Chemical Company). The density of the filled resin was 57 lbs/ft$^3$ and changed very little in 48 hours demonstrating that the product produced was essentially free of holes.

EXAMPLE 4

An aqueous dispersion of iron oxide pigment (Brown 418, Cities Service Company, particle size range 0.2 to 0.8 microns) containing 10% of the pigment was prepared and ball milled to disperse agglomerates. The pigment dispersion was combined with the solution of Example 3 to provide product which, upon drying to 4% $H_2O$, had iron oxide contents of 1, 5 and 10%. Table I shows the compositions of the feed solution-suspensions required to prepare these products.

| Iron Oxide in Product (%) | 0 | 1 | 5 | 10 |
|---|---|---|---|---|
| "D" Silicate (pbw) | 50 | 50 | 49.2 | 48.6 |
| Ammonium Pentaborate (pbw) | 5 | 5 | 4.9 | 4.9 |
| Pigment Dispersion (pbw) | | 2.75 | 14.2 | 29.1 |
| Water (pbw) | 45 | 42.25 | 31.7 | 17.4 |

These solutions were spray dried with an inlet temperature of 380° to 415°C, an outlet temperature of 135° to 165°C and an atomizer pressure of 2.5 to 3.5 kg/cm$^2$. The uniformly brown hollow spheres had the following density properties.

| Pigment in Product(%) | True Particle Density (lbs/ft$^3$) | Bulk Density (lbs/ft$^3$) | Casting Density Polyester Resin* 8% Loading(lbs/ft$^3$) |
|---|---|---|---|
| 0 | 26.2 | 5.4 | 55.1 |
| 1 | 24.2 | 6.2 | 54.3 |
| 5 | 23.6 | 7.5 | 56.4 |
| 10 | 38.6 | 11.0 | 63.4 |

*Marco 17041 polyester resin

These hollow spheres containing 1 and 10% iron oxide pigment were suspended in a bath of petroleum naphtha and 97.8 and 98.3% respectively were found to float after 48 hours, indicating that the product is free of holes and fragments.

EXAMPLE 5

The conditions of Example 4 were followed, except that Brown 422 iron oxide, a product of Cities Service Company, with particles ranging in size from 0.3 to 1.2 micron was used.

| Pigment(%) (Brown 422) | True Particle Density (lbs/ft$^3$) | Bulk Density (lbs/ft$^3$) | Casting Density Polyester Resin* 8% Loading(lbs/ft$^3$) |
|---|---|---|---|
| 0 | 22.2 | 5.2 | 51.4 |
| 1 | 23.6 | 6.5 | 51.8 |
| 5 | 29.8 | 8.6 | 59.6 |
| 10 | 41.4 | 10.2 | 61.0 |

*Marco 17041 polyester resin

EXAMPLE 6

The conditions of Example 4 were followed, except that Burnt Umber BU-8047, a natural iron oxide-containing pigment product of C. K. Williams Company (Pfizer) was used.

| Pigment(%) (BU-8047) | True Particle Density (lbs/ft³) | Bulk Density (lbs/ft³) | Casting Density Polyester Resin* 8% Loading (lbs/ft³) |
|---|---|---|---|
| 0 | 26.1 | 6.4 | 56.8 |
| 1 | 28.5 | 6.7 | 57.5 |
| 5 | 31.6 | 7.4 | 59.5 |
| 10 | 33.9 | 8.1 | 60.4 |

*Marco 17041 polyester resin

EXAMPLE 7

The samples of Examples 4, 5 and 6 that contained 0, 1 and 10% iron oxide were tested for porosity and fragmentation of the spheres by measuring the change in density of a polyester resin on aging. The average changes in casting densities for these samples are summarized in the following table.

| Pigment(%) | Average Change in Casting Density. Polyester Resin* after 24 hours, 8% Loading | |
|---|---|---|
| | lbs/ft³ | % |
| 0 | 1.2 | 2.1 |
| 1 | 2.1 | 4.0 |
| 10 | 1.8 | 3.0 |

*Marco 17041 polyester resin

These results indicate that the hollow spheres prepared by these examples are free from pores or fragmentation.

EXAMPLE 8

A feed solution for the spray dryer was made up as described in Example 3 but with the following quantities of ingredients:

| "D" Sodium Silicate | 100 pbw |
| Ammonium Pentaborate | 10 pbw |
| Water | 90 pbw |
| Antimony Oxide | 20 pbw |

The antimony oxide was a pigment grade called Thermoguard S, produced by M & T Chemicals, Inc., and has an average particle size of approximately 1 micron. This material was added directly to the feed solution mixture under high shear mixing.

Spray drying was done as in Example 4. Post drying was done at 260°C for 2 hours.

The product produced was found to be largely spherical and contained 27% antimony oxide solids. This material had a true particle density of 39.2 lbs/ft³ and a bulk density of 11.3 lbs/ft³.

The products were tested for flame retardant activity by incorporation into Hetron 92 polyester resin, a chlorinated thermoset polyester produced by Hooker Chemical Company, which had been diluted 20% with styrene co-monomer. Flammability testing was done by the oxygen index method, in which the data is reported as the percent oxygen required in a nitrogen-oxygen mixture to just sustain combustion. Materials with higher oxygen indices are less flammable than those with lower oxygen indices.

| Filler | Total Filler Loading phr | Oxygen Index |
|---|---|---|
| None | 0 | 26.9% |
| Unaltered Hollow Spheres | 5 | 26.9 |
| Unaltered Hollow Spheres | 10 | 26.2 |
| Hollow Spheres Containing 27% $Sb_2O_3$ | 5 | 31.7 |
| Hollow Spheres Containing 27% $Sb_2O_3$ | 10 | 33.7 |

The hollow spheres were tested as described in Example 7 and it was found that the change in casting density after 24 hours was 3.4 lbs/ft³ or about 5% indicating that the spheres are free from holes and fragmentation.

EXAMPLE 9

A feed solution for the spray dryer was made up as described in Example 3 but with the following quantities of ingredients.

| "D" Sodium Silicate | 100 pbw |
| Ammonium Pentaborate | 10 pbw |
| Water | 90 pbw |
| Molecular Sieve | 40 pbw |

The molecular sieve was a Linde Type 10X supplied by Union Carbide with an equilibrium adsorption capacity of 36%. The particles above 5 and below 0.5 microns were removed from the sample before use. This material was added directly to the feed solution mixture under high shear.

Spray drying was done as described in Example 4. Post drying was done at 300°C for 2 hours. The product produced contained 41% molecular sieve solids embedded in the walls, had a true particle density of 55.3 lbs/ft³ and a bulk density of 15.2 lbs/ft³. The molecular sieves were then loaded with about 12% di-tertiary butyl peroxide based on the total weight of the hollow spheres by exposing the spheres to the compound.

Ten pbw of the hollow spheres were mixed with 100 pbw Monomer MG-1 (polyethylene glycol dimethacrylate, Union Carbide). The mixture did not gel until heated to 350°F and then the resin set in 7 minutes as the peroxide catalyst was released from the molecular sieve. In this way both the filler and polymerization catalyst were introduced into the resin by the same solid ingredient. The density of the resin was reduced by about 20%.

EXAMPLE 10

Hollow spheres with controlled densities were prepared using the conditions of Example 4. By including sufficient $TiO_2$ or $CaCO_3$ to provide 20% $TiO_2$ or 40% $CaCO_3$ in the product hollow spheres the bulk densities were 13 and 26.6 lbs/ft³ respectively and their true particle densities were 37.5 and 93.6 lbs/ft³. The casting density of the resin filled with 8% of the product hollow spheres was 69.1 lbs/ft³ for the hollow spheres with 20% $TiO_2$ and 77.2 lbs/ft³ for the hollow spheres with 40% CaCO$_3$. Marco 17041 polyester resin was used with a casting density of 76.3 lbs/ft$^3$.

We claim:

1. The process for producing hollow spherical products of 1 to 500 microns with particulate matter imbedded in the walls, comprising the steps of;
   a. forming a solution of 5 to 50% film-forming substance consisting of sodium silicate and a polysalt selected from the group consisting of ammonium pentaborate, sodium pentaborate and sodium hexametaphosphate and 50 to 95% water, wherein the ratio of polysalt to silicate solids is between 0.02:1 and 3:1;
   b. introducing into said solution a particulate matter having a particle size of 0.05 to 10 microns which is substantially unreactive and insoluble in the solution;
   c. agitating said solution and particulate matter to produce a homogeneous suspension-solution, the amount of said particulate solids being sufficient to provide 0.5 to 75% of the solids contained in said suspension-solution;
   d. spray drying the suspension-solution at an inlet temperature of 200° to 500°C and an outlet temperature of 100° to 300°C;
   e. collecting the product having a true particle density of 20 to 200 lbs/ft$^3$.

2. The process of claim 1 wherein the polysalt is sodium hexametaphosphate, the suspension-solution includes 1.5 to 60% suspended particulate solids and 29.6 to 48% film-forming solids of sodium hexametaphosphate and sodium silicate, and the ratio of sodium hexametaphosphate solids to sodium silicate solids is between 1:1 and 3:1.

3. The process of claim 1 wherein the polysalt is sodium pentaborate, the suspension-solution includes 0.9 to 51.2% suspended particulate solids and 17.4 to 34.5% film-forming solids of sodium pentaborate and sodium silicate, and the ratio of sodium pentaborate solids to sodium silicate between 0.02:1 and 0.3:1.

4. The process of claim 1 wherein the polysalt is ammonium pentaborate, the suspension-solution includes 0.25 to 51.2% suspended particulate solids, and 5 to 34.5% film-forming solids of ammonium pentaborate and sodium silicate, and the ratio of ammonium pentaborate solids to ammonium pentaborate solids to ammonium pentaborate solids is between 0.03:1 and 0.5:1.

5. The process of claim 4 wherein the ratio of ammonium pentaborate solids to sodium silicate solids is between 0.06:1 and 0.5:1.

6. The process of claim 4 wherein the particulate matter has a particle size of 0.05 to 10 microns.

7. The process of claim 4 wherein the particulate matter is a pigment with a particle size between 0.05 and 6 microns.

8. The process of claim 7 wherein the suspension-solution includes 5 to 34.8% ammonium pentaborate and sodium silicate solids and 0.05 to 5.6% pigment solids selected from a group consisting of the oxides of iron, Chromium III, titanium, zinc and antimony, praseodynium zirconium silicate, vanadium zirconium silicate, talc, copper phthalocyanine, carbon black, nickel antimony titanate, cadmium sulfide, lead chromate, cobalt aluminate, and silicon carbide.

9. The process of claim 4 wherein the particulate matter is reactive and has a particle size of 0.5 to 5 microns.

10. The process of claim 9 wherein the suspension-solution includes 5 to 33.8% ammonium pentaborate-sodium silicate solids and 0.5 to 26% reactive particles selected from a group consisting of activated charcoal, zinc oxide, silica gel, magnesium oxide, zeolites, ferrites, molecular sieves, and ion exchange resins.

11. The process of claim 4 wherein the particulate matter is a fire retardant and has a particle size of 0.5 to 3 microns.

12. The process of claim 11 wherein the suspension-solution includes 5 to 31.5% ammonium pentaborate-sodium silicate solids and 1.2 to 51.2% fire retardant particles selected from a group consisting of antimony trioxide, antimony tetraoxide, combinations of antimony trioxide and talc, zinc borate, aluminum hydroxide and titanium dioxide.

13. The process of claim 6 wherein the suspension-solution includes 5 to 33% ammonium pentaborate-silicate solids and 2.8 to 51.2% particulate matter selected from a group consisting of magnesium oxide, alumina, zinc oxide, silica gel, calcium carbonate, calcium silicate (wollastonite), magnesium silicate (talc), barium sulfate, calcium sulfate, carbon black and ground glass.

14. The process of claim 6 wherein the particulate matter has a specific gravity of 2.2 to 5.7.

15. A hollow product of largely spherical nature with a particle size of 10 to 500 microns and a true particle density of 20 to 200 lbs/ft$^3$ consisting essentially of 25 to 99.5% film-forming substance consisting of sodium silicate and a polysalt selected from a group consisting of ammonium pentaborate, sodium pentaborate and sodium hexametaphosphate; 0.5 to 75% particulate matter embedded in the walls and 0 to 7% water with the ratio of polysalt solids to sodium silicate solids between 0.02:1 and 3:1.

16. The product of claim 15 wherein the polysalt is sodium pentaborate and the ratio of sodium pentaborate solids to sodium silicate solids is between 0.02:1 and 0.3:1.

17. The product of claim 15 wherein the polysalt is sodium hexametaphosphate and the ratio of sodium hexametaphosphate solids to sodium silicate solids is between 1:1 and 3:1.

18. The product of claim 15 wherein the polysalt is ammonium pentaborate and the ratio of ammonium pentaborate solids to silicate solids is between 0.03:1 and 0.5:1.

19. The product of claim 18 wherein the ratio of ammonium pentaborate solids to sodium silicate solids is between 0.06:1 and 0.5:1.

20. The product of claim 18 wherein the product is pigmenting, has a true particle density of 20 to 40 lbs/ft$^3$ and consists essentially of 85 to 99% of ammonium pentaborate and sodium silicate 0 to 7% water and 1 to 15% particulate matter selected from a group consisting of the oxides of iron, chromium III, titanium, zinc and antimony; praseodynium zirconium silicates, vanadium zirconium silicate, talc, copper phthalocyanine, carbon black, nickel antimony titanate, cadmium sulfide, lead chromate, cobalt antimonate and silicon carbide.

21. The product of claim 18 wherein the product contains reactive particles, has a true particle density of 20 to 40 lbs/ft$^3$ and consists essentially of 50 to 90% ammonium pentaborate and sodium silicate, 0 to 7% water and 10 to 50% reactive particles selected from the group consisting of activated charcoal, zinc oxide, silica gel, magnesium oxide, zeolite and ferrites.

22. The product of claim 18 wherein the product contains fire retardant particles, has a true particle density of 25 to 81 lbs/ft$^3$ and consists essentially of 25 to 75% ammonium pentaborate and sodium silicate, 0 to 7% water and 25 to 75% fire retardant particles selected from a group consisting of antimony trioxide, antimony tetraoxide, combinations of antimony trioxide and talc, zinc borate, aluminum hydroxide, barium metaborate, zinc oxide and titanium dioxide.

23. The product of claim 18 wherein the true particle density is controlled between 31.2 and 200 lbs/ft$^3$ and consists essentially of 25 to 85% ammonium pentaborate and sodium silicate, 0 to 7% water and 15 to 75% particles selected from a group consisting of magnesium oxide, alumina, zinc oxide, silica gel, calcium carbonate, calcium silicate (wollastonite), magnesium silicate (talc), barium sulfate, calcium sulfate, carbon black and ground glass.

* * * * *